July 2, 1968 U. MERTEN 3,390,773
WATER PURIFICATION SYSTEM
Filed April 13, 1965 2 Sheets-Sheet 2

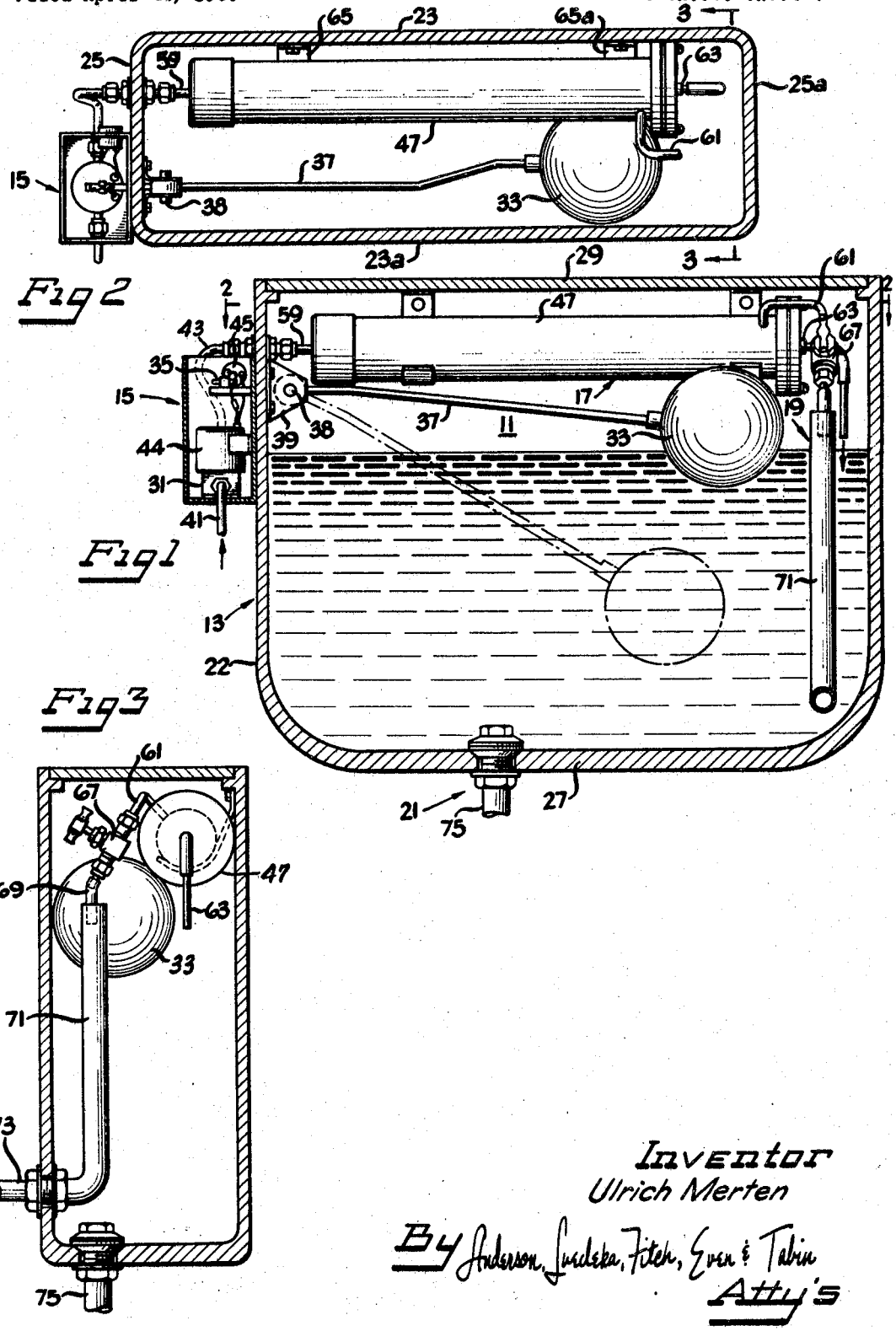

Inventor
Ulrich Merten

United States Patent Office 3,390,773
Patented July 2, 1968

3,390,773
WATER PURIFICATION SYSTEM
Ulrich Merten, Solana Beach, Calif., assignor, by mesne assignments, to Gulf General Atomic Incorporated, San Diego, Calif., a corporation of Delaware
Filed Apr. 13, 1965, Ser. No. 447,769
4 Claims. (Cl. 210—125)

ABSTRACT OF THE DISCLOSURE

A reverse osmosis water purification system including a reservoir for purified water, a reverse osmosis unit connected to a water supply system, means responsive to the level of purified water in the reservoir for controlling entry of supply water into the reverse osmosis unit, including means for limiting the upper level of purified water in the reservoir and means for preventing entry of supply water into the reverse osmosis unit until the capacity of the reservoir for additional purified water is significantly greater than the volume of water in the reverse osmosis unit, an outlet for discharging waste water from the reverse osmosis unit and means for throttling the flow of waste water to maintain the hydraulic pressure of the supply water above the osmotic pressure of the reverse osmosis unit.

The present invention relates generally to purification of water. In particular, it relates to purification of potable water which has undesirable flavor.

This invention resulted from work done under Contract No. 14-01-0001-250 with the Office of Saline Water in the Department of the Interior, entered into pursuant to the Saline Water Act, 42 U.S.C. 1951–1958g.

In many areas, water which is supplied to consumers, while potable, contains sufficient dissolved materials to impart a discernible flavor thereto. Such flavor is objectionable to many people, and the sensitivity of individuals to such flavor varies widely enough so that in some cases even very minor concentrations of dissolved materials render it distasteful.

As a consequence, a substantial business exists to supply relatively pure water for drinking purposes. Customarily, such water has a very low content of dissolved materials or contains only dissolved materials which do not contribute objectionable flavor. It is usually distributed in glass containers which, because of their weight and volume, contribute substantially to the cost of distribution. In general, the cost of such water to the consumer is high.

It is the primary object of the present invention to provide means for purification of water. It is a more particular object of the present invention to provide apparatus for the removal from otherwise potable water of dissolved impurities which contribute undesired flavor thereto. A further object of the present invention is to provide apparatus for automatically supplying a quantity of demineralized water in the home. A still further objective of the present invention is to utilize domestic water pressure to provide the energy required for purification. Other objects of the present invention will become apparent from the following description and drawing in which:

FIGURE 1 is a cross-sectional view, in elevation, of a water purification system suitable for the practice of the present invention;

FIGURE 2 is a sectional view taken along lines 2—2 of FIGURE 1;

FIGURE 3 is a sectional view taken along lines 3—3 of FIGURE 2; and

Figure 4:
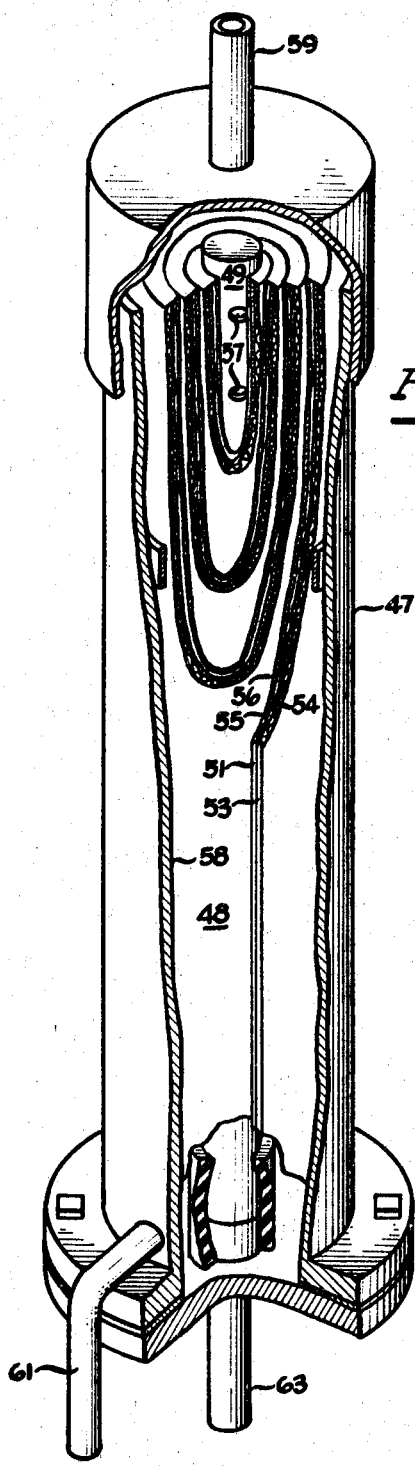
FIGURE 4 is a perspective view, partly broken away, of a water purification unit which comprises an element of the water purification system.

In accordance with the present invention, and with particular reference to FIGURE 1 of the drawing, a particular embodiment of a water purification system 11 suitable for the practice of the present invention comprises reservoir means 13, water supply means 15, reverse osmosis means 17, drain means 19, and product water discharge means 21.

The reservoir means 13 comprises a tank 22 having opposed pairs of walls 23 and 23a and 25 and 25a and a base wall 27. A removable cover 29 is provided which is retained on suitable shoulders on side walls 23 and 23a and 25 and 25a.

The water supply means 15 comprises a solenoid-actuated valve 31, a float 33, and a micro-switch 35. The float 33 is attached to an arm 37 which is pivotally mounted on a pin 38 extending through a bracket 39. The arm 37 extends through an opening in wall 25 of the reservoir means 13, and the micro-switch 35 is mounted thereon externally of the reservoir 13. As illustrated in FIGURE 1, the position of the float 33 is dependent upon the level of water contained in the reservoir means 13. The water supply means 15 further includes a water supply conduit 41 which is in fluid communication with one side of the valve 31, and a water feed conduit 43 which is in fluid communication with the other side of the valve 31. There is further provided an electrical connector 45 from which electrical current is provided to the solenoid 44 through a circuit which includes the micro-switch 35.

In the embodiment chosen to illustrate the apparatus of the present invention which is shown in the drawing, the reverse osmosis means 17 comprises a water purification unit 47 of the type disclosed in co-pending application Ser. No. 419,881, filed Dec. 21, 1964, and assigned to the assignee of the present application. As particularly illustrated in FIGURE 4, the purification unit 47 includes a membrane module 48 which comprises a hollow mandrel 49 on which an envelope 51 and a separator grid 53 are spirally wound. The envelope 51 comprises two sheets 54 and 55 of a membranous material which has semi-permeable properties, such as cellulose acetate. Between the two sheets 54 and 55 of the envelope 51 is disposed a backing material 56 which is porous but which also is resistant to collapse when subject to hydraulic pressure. The backing material 56 terminates at the hollow mandrel 49 adjacent a plurality of openings 57 spaced therealong. The membrane module 48 is disposed in a casing 58, to which are attached an inlet nipple 59, and a waste outlet tube 61. A purified water outlet nipple 63 is also provided which is in fluid communication with the hollow mandrel 49 of the membrane module 48.

As more particularly set forth in application Ser. No. 419,881, water to be purified is supplied to the inlet nipple 59 at a hydraulic pressure greater than its osmotic pressure, and flows axially through the membrane module 48 through the spiral passageway defined by the separator grid 53. A portion of the supplied water diffuses through the sheets 54 and 55 and into the backing material 56, and thence into the hollow mandrel 49 through the openings 57. The water which is collected within the hollow mandrel 49 contains substantially less dissolved impurities than the water supplied to the purification unit 47. Such purified water is discharged through the purified water outlet nipple 63. Residual water which does not diffuse into the hollow mandrel 49, and dissolved materials contained therein, are discharged through the waste outlet tube 61.

As illustrated in the drawing, the water purification unit 47 is disposed within the tank 22, and is supported by brackets 65 and 65a attached to wall 23. The inlet nipple 59 of the water purification unit 47 is in fluid communication with the water feed conduit 43 through an opening provided in wall 22 by means of suitable conventional fittings. As best illustrated in FIGURE 3, the waste outlet tube 61 of the water purification unit 47 is connected to a metering and throttling valve 67. The metering and throttling valve 67, in turn, is connected to a drain hose 69.

The drain hose 69 is positioned within an overflow pipe 71 of the drain means 19. The overflow pipe 71 extends upwardly from an opening provided in the side wall 27a of the reservoir means 13 to a preselected position thereabove. The overflow pipe 71 is connected to a drain pipe 73 by means of conventional fittings which provide a liquid-tight seal in side wall 27a. The drain pipe 73 is, in turn, connected to appropriate liquid waste disposal means (not illustrated).

The product water discharge means 21 comprises a product water pipe 75 which, by means of conventional fittings, provides fluid communication through base wall 27 of the reservoir means 13 to a faucet or other dispensing means (not illustrated).

In accordance with the method of the present invention, water which is to be purified is supplied to the water supply means 15 at a pressure greater than the osmotic pressure thereof. In this connection, it is normal practice to supply water to consumers at elevated pressure. Most city water systems supply water at pressures greater than 40 p.s.i.g., and delivery pressure may be as high as 130 p.s.i.g. In practically all areas, the water supplied for residential purposes has an osmotic pressure of 10 p.s.i.g. or less and, consequently, purification thereof by reverse osmosis can be carried out under normal delivery pressure.

Assuming that, initially, the water level in the tank 22 is such that the float 33 is in the position indicated by the dotted outline in FIGURE 1, the position of the arm 37 is such that the micro-switch 35 is closed. Electrical current is thereby provided to the solenoid-actuated valve 31, causing it to open. The water to be purified therefore is conducted through the solenoid-actuated valve 31, the water feed conduit 43, and the inlet nipple 59 of the water purification unit 47.

Water to be purified passes axially through the spiral passageway in the membrane module 48 defined by the separator grid 53, and thence through the waste outlet tube 61 and the metering and throttling valve 67. The metering and throttling valve 67 is set at a preselected opening which will permit a relatively low rate of flow through the water purification unit 47. Such flow rate is sufficiently low so that there is negligible pressure drop through the water purification unit, thereby enabling the hydraulic pressure therein to be substantially that of the supply pressure throughout the unit.

Under these conditions, diffusion of purified water through the semi-permeable sheets 54 and 55 of the envelope 51 occurs, resulting in collection of purified water in the hollow mandrel 49. The purified water so collected is discharged through the purified water outlet nipple 63, which results in collection of water within the tank 22.

Collection of purified water in the tank 22 continues until a preselected maximum level is attained therein. At such preselected level, the float 33 and arm 37 are disposed in a position whereat the micro-switch 35 opens, and the electric current to the solenoid 44 of the solenoid-actuated valve 31 is terminated. The valve thereupon returns to its closed position, terminating flow of water to be purified to the water purification unit 47.

It should be understood that alternative means for controlling flow of water to the water purification unit may be utilized. For example, a mechanical linkage of the float 33 to a water supply valve may be utilized in place of the micro-switch 35 and solenoid-actuated valve 31 of the illustrated embodiment.

Water which passes through the water purification unit 47 and through the metering and throttling valve 67 is discharged through the overflow pipe 71 and is discarded. If for any reason the flow of water to the water purification unit 47 is not terminated, the overflow pipe 71 also serves to limit the upper level of water attainable in the tank 22.

In a particular example of the practice of the present invention, a water purification unit 47 was provided comprising a membrane module 48 in which were provided semi-permeable sheets 54 and 55 of high selectivity. Water was supplied to the water supply means 15 at a supply pressure of 75 p.s.i.g. The opening of the metering and throttling valve 67 was adjusted so that, at such supply pressure, the rate of flow through the unit resulted in a waste water flow into the overflow pipe 71 of about 4 gallons/day. The rate of diffusion of purified water into the tank 22 was about 1.25 gallons/day.

The foregoing water purification system was installed in a residence and was operated automatically for a 3-month period. In Table I is shown the conductivity of the water supplied to the system and the conductivity of the purified water in the tank 22 at various intervals in that period.

TABLE I

| Days of Operation | Conductivity | |
|---|---|---|
| | Supply Water ($\mu$mhos/cm.) | Purified Water ($\mu$mhos/cm.) |
| 2 | 910 | 230 |
| 30 | 900 | 190 |
| 57 | 1,000 | 270 |
| 89 | 950 | 95 |

Operation of the system was satisfactory throughout the test period. The taste characteristics of the purified water were good, and were comparable to bottled water available commercially.

In order to obtain consistently desirable operation of the described system, the water supply means 15 is appropriately designed so that the solenoid-actuated valve 31 is not opened until the tank 22 has a capacity for additional purified water in an amount many times greater than the hold up in the water purification unit 47. In this connection, when the level of purified water in the tank 22 reaches its preselected maximum and the solenoid-actuated valve 31 is closed, dissolved impurities in the residual water in the water purification unit 47 slowly diffuse through the semi-permeable membrane and into the purified water. Thereafter, when supply of water to be purified is resumed, the initial throughput is of lower quality than that which is delivered during steady state conditions. This effect is greatest when the system is used far below its capacity.

If, however, the solenoid-actuated valve 31 does not open until there is room for a substantial amount of purified water, the initial low-purity water is diluted, and satisfactory operation is assured.

Thus, there has been provided a method and apparatus for purification of potable water to remove undesired flavor caused by dissolved materials. The apparatus is economically constructed and is capable of automatic operation over extended periods of time without maintenance.

Various of the features of the present invention are set forth in the following claims.

What is claimed is:

1. Apparatus for automatically providing a quantity of purified water suitable for drinking purposes from a water supply containing undesired components and having an elevated hydraulic pressure, which apparatus comprises reservoir means, a unit for separating purified water from the supply water by reverse osmosis, inlet means in fluid communication with said reverse osmosis unit for conducting supply water thereto, outlet means for purified water from said reverse osmosis unit leading to said reservoir means, means responsive to the level of purified water in said reservoir for allowing and for stopping the entry of supply water into said reverse osmosis unit, said reverse osmosis unit containing a certain volume of water which is held up therein when said level responsive means prevents the entry of supply water, said level responsive means including means for limiting the upper level of purified water in said reservoir means and being designed not to allow the entry of supply water into said reverse osmosis unit to resume until the capacity of said reservoir means for additional purified water is significantly greated than said volume of water held up in said reverse osmosis unit, outlet means for discharging the waste water from said reverse osmosis unit, and means in connection with said waste outlet means for throttling the discharge flow of waste water so as to maintain the hydraulic pressure of said supply water in said reverse osmosis unit at a value higher than the osmotic pressure of said reverse osmosis unit.

2. Apparatus in accordance with claim 1 wherein said reservoir means includes a substantially enclosed tank with said reverse osmosis unit mounted within said tank.

3. Apparatus in accordance with claim 1 wherein said level responsive means includes a solenoid-actuated valve connected to said inlet means, a float in said reservoir means, and switch means connected to said valve and said float to actuate said valve to allow the flow of supply water to said reverse osmosis unit when the level of purified water reaches a preselected minimum and to stop the flow of supply water to said reverse osmosis unit when the level of purified water reaches a preselected maximum.

4. Apparatus in accordance with claim 1 wherein said throttling means is an adjustable throttling valve having a plurality of preselected openings to which it can be set.

References Cited

UNITED STATES PATENTS

| | | | |
|---|---|---|---|
| Re. 26,097 | 10/1966 | Michaels | 210—321 |
| 1,653,204 | 12/1927 | Dahlin | 210—125 X |
| 1,825,631 | 9/1931 | Horvath | 210—125 X |
| 2,741,595 | 4/1956 | Juda | 210—321 X |
| 3,133,132 | 5/1964 | Loeb et al. | 210—321 |
| 3,171,808 | 3/1965 | Todd | 210—321 |
| 3,244,763 | 4/1966 | Cahn | 210—22 X |

SAMIH N. ZAHARNA, *Primary Examiner.*

REUBEN FRIEDMAN, *Examiner.*

C. DITLOW, *Assistant Examiner.*